(12) United States Patent
Connelly

(10) Patent No.: US 12,511,813 B1
(45) Date of Patent: Dec. 30, 2025

(54) TECHNIQUES FOR PROVIDING PROPRIETARY TILE-BASED AND/OR NON-TILE-BASED GRAPHICS PROCESSING TO AN OPEN-SOURCE INFRASTRUCTURE MODELING PLATFORM

(71) Applicant: Bentley Systems, Incorporated, Exton, PA (US)

(72) Inventor: Paul Connelly, Coatesville, PA (US)

(73) Assignee: Bentley Systems, Incorporated, Exton, PA (US)

( * ) Notice: Subject to any disclaimer, the term of this patent is extended or adjusted under 35 U.S.C. 154(b) by 355 days.

(21) Appl. No.: 18/204,771

(22) Filed: Jun. 1, 2023

(51) Int. Cl.
*G06T 15/00* (2011.01)
*G06F 8/36* (2018.01)

(52) U.S. Cl.
CPC .............. *G06T 15/005* (2013.01); *G06F 8/36* (2013.01)

(58) Field of Classification Search
CPC ................................ G06T 15/005; G06F 8/36
See application file for complete search history.

(56) References Cited

U.S. PATENT DOCUMENTS

| | | |
|---|---|---|
| 6,341,291 B1 | 1/2002 | Bentley et al. |
| 8,706,692 B1 | 4/2014 | Luthra |
| 8,719,229 B1 | 5/2014 | Awe et al. |
| 9,053,080 B2 | 6/2015 | Look et al. |
| 9,390,201 B2 | 7/2016 | Rameau et al. |
| 9,430,229 B1 | 8/2016 | Van Zijst et al. |
| 9,575,764 B1 | 2/2017 | Turner et al. |

(Continued)

FOREIGN PATENT DOCUMENTS

| | | |
|---|---|---|
| CN | 1825306 A | 8/2006 |
| CN | 105912411 A | 8/2016 |

(Continued)

OTHER PUBLICATIONS

Chinese Search Report for Chinese Application No. 201980082365.4 dated Jun. 12, 2023, pp. 1-2.

(Continued)

*Primary Examiner* — Michelle Chin
(74) *Attorney, Agent, or Firm* — Cesari and McKenna, LLP; James A. Blanchette

(57) ABSTRACT

In example embodiments, a proprietary implementation of tile-based and/or non-tile-based graphics processing is provided at run-time as a binary for use in an open-source infrastructure modeling platform. An open-source repository from which the infrastructure modeling platform is built includes a backend module and definitions of the interface of a visualization module from a private repository that implements the tile-based and/or non-tile-based processing. The open-source repository lacks code for the underlying implementation of the visualization module. The implementation of the visualization module is instead maintained in a private repository and built therefrom. In operation, the backend module calls an exposed function of a DLL that returns a pointer to a binary implementation of the visualization module. When graphics of an infrastructure model are required, the backend module utilizes the defined interface with the pointer to request tile-based and/or non-tile-based processing from the visualization module.

22 Claims, 6 Drawing Sheets

(56) References Cited

U.S. PATENT DOCUMENTS

| | | | |
|---|---|---|---|
| 10,311,170 B2 | 6/2019 | Heidinger et al. | |
| 11,100,703 B2 | 8/2021 | Connelly et al. | |
| 11,113,847 B2 | 9/2021 | Connelly et al. | |
| 11,144,309 B2 | 10/2021 | Wilson et al. | |
| 11,645,296 B1 | 5/2023 | Bentley et al. | |
| 12,229,550 B2 | 2/2025 | Bentley et al. | |
| 2005/0198244 A1 | 9/2005 | Eilam | |
| 2007/0021955 A1 | 1/2007 | Tolone | |
| 2007/0299937 A1 | 12/2007 | Winter et al. | |
| 2008/0140732 A1 | 6/2008 | Wilson et al. | |
| 2011/0004827 A1* | 1/2011 | Doerr | H04L 67/75 709/208 |
| 2011/0113359 A1 | 5/2011 | Massey et al. | |
| 2011/0126275 A1 | 5/2011 | Anderson | |
| 2011/0264678 A1 | 10/2011 | Mital et al. | |
| 2012/0096070 A1 | 4/2012 | Bryzak | |
| 2012/0284684 A1 | 11/2012 | Michaely et al. | |
| 2013/0036400 A1 | 2/2013 | Bak et al. | |
| 2014/0013099 A1 | 1/2014 | Sekiguchi et al. | |
| 2014/0053145 A1 | 2/2014 | Steigleder | |
| 2014/0358860 A1 | 12/2014 | Wautier | |
| 2015/0106790 A1 | 4/2015 | Bigwood et al. | |
| 2015/0229638 A1 | 8/2015 | Loo | |
| 2015/0286558 A1 | 10/2015 | Bartlow et al. | |
| 2016/0162363 A1 | 6/2016 | Letkeman | |
| 2017/0123934 A1 | 5/2017 | Bentley | |
| 2017/0220606 A1 | 8/2017 | Wang et al. | |
| 2017/0277761 A1 | 9/2017 | Bentley et al. | |
| 2018/0144016 A1 | 5/2018 | Bestfleisch et al. | |
| 2019/0004925 A1 | 1/2019 | Buckingham et al. | |
| 2019/0079958 A1 | 3/2019 | Bentley et al. | |
| 2019/0081847 A1 | 3/2019 | Bentley et al. | |
| 2019/0108245 A1 | 4/2019 | Bentley et al. | |
| 2019/0354540 A1 | 11/2019 | Stigsen | |
| 2020/0117445 A1 | 4/2020 | Wilson et al. | |
| 2020/0303060 A1* | 9/2020 | Haemel | G06N 3/082 |
| 2022/0076503 A1 | 3/2022 | Connelly | |
| 2023/0177229 A1 | 6/2023 | Marini et al. | |
| 2023/0244684 A1 | 8/2023 | Bentley et al. | |

FOREIGN PATENT DOCUMENTS

| | | |
|---|---|---|
| CN | 106462639 A | 2/2017 |
| CN | 106575227 A1 | 4/2017 |
| WO | WO-2014/193458 A1 | 12/2014 |

OTHER PUBLICATIONS

"Notification of Transmittal of the International Search Report and the Written Opinion of the International Searching Authority, or the Declaration," International Filing Date: Oct. 1, 2019, International Application No. PCT/US2019/054017, Applicant: Bentley Systems, Incorporated, Date of Mailing: Jan. 27, 2020, pp. 1-13.

Scott, Tamara, "How to Use an API: Just the Basics," Retrieved from the Internet: <https://technologyadvice.com/blog/information-technology/how-to-use-an-api/>, Dec. 19, 2016, pp. 1-11.

U.S. Appl. No. 16/156,824, filed Oct. 10, 2018 by Ramanujam Raman et al. for Technique for Generating a Change Cache Database Utilized to Inspect Changes Made to a Repository, pp. 1-35.

U.S. Appl. No. 16/559,057, filed Sep. 3, 2019 by Keith A. Bentley et al. for Techniques for Decoupling Access to Infrastructure Models, pp. 1-26.

Chinese Office Action for Chinese Application No. 201980067119.1 dated Jul. 30, 2024, pp. 1-24.

Chinese Search Report for Chinese Application No. 201980067119.1 dated Jul. 29, 2024, pp. 1-5.

Brun, Yuriy, et al., "Early Detection of Collaboration Conflicts and Risks," IEEE, IEEE Computer Society, IEEE Transactions on Software Engineering, IEEE Service Center, Los Alamitos, CA, US, vol. 39, No. 10, Oct. 1, 2013, pp. 1358-1375.

"Chinese Search Report for Chinese Application No. 2019800823654", dated May 19, 2024, pp. 1-2.

"Chinese Search Report for Chinese Application No. 2019800671191", dated Dec. 4, 2024, pp. 1-2.

"Notification of Transmittal of the International Search Report and the Written Opinion of the International Searching Authority, or the Declaration," International Filing Date: Oct. 1, 2019, International Application No. PCT/US2019/054051, Applicant: Bentley Systems, Incorporated, Date of Mailing: Jan. 22, 2020, pp. 1-16.

U.S. Appl. No. 18/213,588, filed Jun. 23, 2023 by Paul Connelly for Techniques for Providing Proprietary Solid Modeling to an Open-Source Infrastructure Modeling Platform, pp. 1-38.

* cited by examiner

TECHNIQUES FOR PROVIDING PROPRIETARY TILE-BASED AND/OR NON-TILE-BASED GRAPHICS PROCESSING TO AN OPEN-SOURCE INFRASTRUCTURE MODELING PLATFORM

BACKGROUND

Technical Field

The present disclosure relates generally to visualizing an infrastructure model, and more specifically to techniques for providing tile-based and non-tile-based graphics processing to an open-source infrastructure modeling platform.

Background Information

Infrastructure typically refers to structures and facilities needed for the operation of an organization, company, community, country, or other entity, such as buildings, factories, plants, roads, railways, utility networks, and the like. As part of the design, construction and/or operation of infrastructure, it is often desirable to create infrastructure models. As used herein, the term "infrastructure model" refers to a 3D computer aided design (CAD) model of infrastructure. An infrastructure model may be a built infrastructure model (BIM) or digital twin of infrastructure. A BIM is a digital representation of infrastructure as it should be built, providing a mechanism for visualization and collaboration. A digital twin is a digital representation of infrastructure as it is actually built, and is often synchronized with information representing current status, working condition, position, or other qualities. An infrastructure model is typically composed of a number of individual elements. As used herein, the term "element" refers to a record that represents (i.e., "models," in a colloquial sense of the term) an individual entity within an infrastructure model. Elements may be represented using symbology (i.e., attributes that define visual appearance such as colors, line weights, line styles, etc.). and geometric primitives (i.e., simple geometric shapes, such as cubes, cylinders, cones, etc.).

To render a view of an infrastructure model, the geometry of each element within the visible region of the infrastructure model typically must be converted to a low-level representation of graphics, such as a polygon mesh, consumable by a graphics processing unit (GPU). The GPU may then consume the low-level representation of graphics and produce a display on a screen. When a user interacts with the infrastructure model and changes the geometry of an element, the low-level representation becomes out of date, and the processing needs to be repeated. A new low-level representation typically must be computed that reflects the changed geometry.

Two general types of approaches have been employed to render a view of an infrastructure model: tile-based graphics processing and non-tile-based graphics processing. In typical tile-based graphics processing, the volume of the infrastructure model is subdivided into tiles each containing graphics (e.g., polygon meshes) that represent the collective geometry of a set of elements intersecting the tile's volume. Tiles may be hierarchically organized into a tile tree that provides different levels of detail (LOD) (e.g., with a single root tile representing the entire volume, and multiple tiles on each subsequent level under the root representing smaller volumes but at a greater LOD). All the elements of a tile are typically drawn together. Depending on the use case, tiles may be pre-generated, generated upon first demand, or otherwise generated, and often cached for subsequent reuse. In typical non-tile-based graphics processing, elements or sequences of underlying symbology and geometric primitives are drawn independently of other elements/sequences as discrete graphics (e.g., polygon meshes) that represent the individual geometry. If one element's geometry changes, only that element's graphics must be regenerated, rather than an entire tile.

There is a growing trend for software functionality to be offered as open-source software that allows users to use, study, and change the underlying source code. This trend extends to infrastructure modeling software functionality. For example, infrastructure modeling functionality (e.g., BIM or digital twin functionality) may be offered as an open-source platform (e.g., an open-source library) that includes modules for creating, querying, modifying, and displaying infrastructure models. Such an open-source platform may be used by third parties to develop their own infrastructure modeling applications. An example of such an open-source platform is the iTwin.js library for developing infrastructure digital twin applications available from Bentley Systems, Inc.

An open-source platform may be designed with open-source modules that generate graphics for a view of an infrastructure model. However, implementing such functionality in open-source modules may have shortcomings. For example, since users are permitted to change open-source software, there is the potential for them to introduce incompatibility with other software. Likewise, since users are permitted to study the underlying source code of open-source software, there is the potential for revealing proprietary technology, security vulnerabilities, or other types of information that may be better kept confidential.

While one could simply provide a fully proprietary platform instead of an open-source platform, such an approach similarly has shortcomings. Open-source software often achieves quicker market adoption as it may offer lower starting costs, more flexible software development processes, robust community-driven support, and other advantages.

Accordingly, there is a need for improved techniques for providing tile-based and/or non-tile-based graphics processing to an infrastructure modeling platform.

SUMMARY

In various embodiments, a proprietary implementation of tile-based and/or non-tile-based graphics processing is provided at run-time as a binary to an open-source infrastructure modeling platform. An open-source repository from which the infrastructure modeling platform is built includes a backend module and definitions of the interface of a visualization module from a private repository that implements the tile-based and/or non-tile-based processing. The open-source repository lacks code for the underlying implementation of the visualization module. In operation, the backend module calls an exposed function of a dynamically loaded module (DLL) that returns a pointer to a binary implementation of the visualization module. When graphics of an infrastructure model are required, the backend module utilizes the defined interface with the pointer to request tile-based and/or non-tile-based processing from the visualization module. The visualization module processes the requests, either returning processed graphics or an error. By dividing the functionality between the backend module built from the open-source repository and the visualization module built from the private repository, many of the advantages of open-source software may be achieved while avoiding some of the shortcomings.

In one example embodiment, a method is provided for rendering an infrastructure model within an open-source infrastructure modeling platform. A backend module of an open-source infrastructure modeling platform executing on a client device, or one or more cloud computing devices, calls a function of a DLL to obtain a pointer to an implementation of a visualization module built from a private repository that implements tile-based and/or non-tile-based graphics processing. When it is determined there is a need to render graphics for at least a portion of the infrastructure model, the backend module utilizes an interface of the visualization module with the pointer to request tile-based and/or non-tile-based processing of graphics by the implementation, wherein the request includes at least one of an identification of a set of elements that intersect a volume of a tile, identification of a set of elements, or an identification of a symbology and geometric primitives. Processed graphics are received at a frontend module of the open-source infrastructure modeling platform for display to a user.

In another example embodiment, a non-transitory electronic device readable medium having instructions stored thereon for an open-source infrastructure modeling platform is provided. The instructions when executed by one or more processors of one or more computing devices are operable to call a function to obtain a pointer to an implementation of a visualization module built from a private repository that implements tile-based and/or non-tile-based graphics processing. The instructions are further operable to determine a need to render graphics for at least a portion of the infrastructure model and utilize an interface of the visualization module with the pointer to request tile-based and/or non-tile-based processing of graphics by the implementation, wherein the request includes at least one of an identification of a set of elements that intersect a volume of a tile, identification of a set of elements, or an identification of a symbology and geometric primitives. The instructions are also operable to receive back graphics for display.

It should be understood that a variety of additional features and alternative embodiments may be implemented other than those discussed in this Summary. This Summary is intended simply as a brief introduction to the reader and does not indicate or imply that the examples mentioned herein cover all aspects of the disclosure or are necessary or essential aspects of the disclosure.

BRIEF DESCRIPTION OF THE DRAWINGS

The description below refers to the accompanying drawings of example embodiments, of which.

DETAILED DESCRIPTION

The following detailed description describes example embodiments. Any references to items in the singular should be understood to include items in the plural, and vice versa, unless explicitly stated or otherwise clear from the context. Grammatical conjunctions are generally intended to express any and all disjunctive and conjunctive combinations of conjoined clauses, sentences, words, and the like, unless otherwise stated or clear from the context. For example, the term "or" should generally be understood to mean "and/or." Any recitation of ranges of values are not intended to be limiting, are provided as examples only, and are not intended to constitute a limitation on the scope of the described embodiments. Further, any recitation of ranges should be interpreted as referring individually to any and all values falling within the range, unless otherwise indicated, and each separate value within such a range should be treated as if it were individually recited. Terms of approximation such as "about." "approximately." "substantially" or the like, should be construed as referring to an allowance for deviation that is appreciated by one of ordinary skill in the art to still permit satisfactory operation for the corresponding use, function or purpose, or the like. No language in the description should be construed as indicating an element is a necessary or essential aspect of the disclosure.

Figure 1:
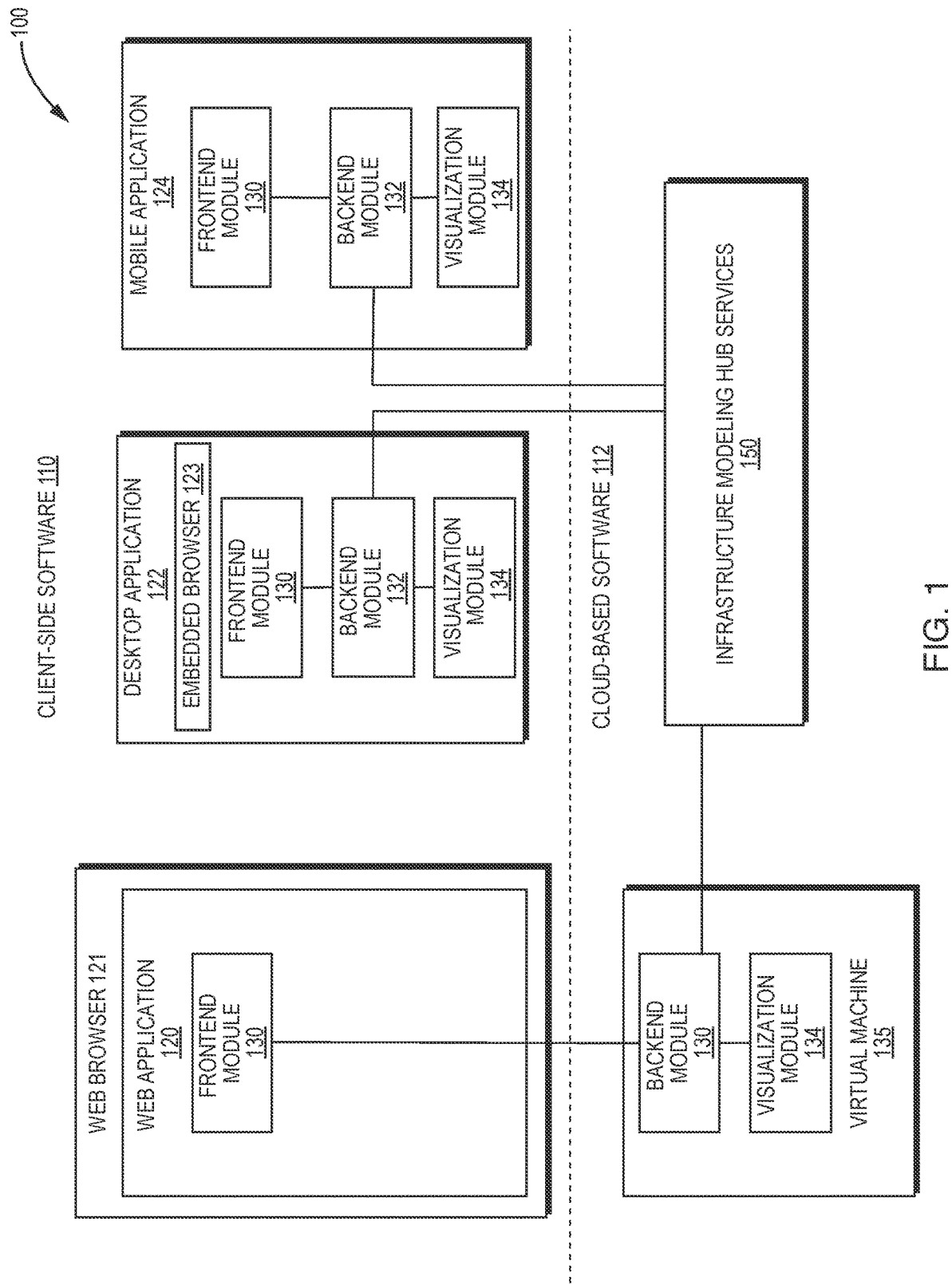
FIG. 1 is a high-level block diagram showing use of an open-source infrastructure modeling platform.

FIG. 1 is a high-level block diagram 100 showing use of an open-source infrastructure modeling platform. In one embodiment, the open-source infrastructure modeling platform is the iTwin.js library available from Bentley Systems, Inc. The block diagram 100 may be divided into client-side software 110 that executes on one or more computing devices local to an end-user (collectively "client devices") and cloud-based software 112 that executes on one or more computing devices remote from the end-user (collectively "cloud computing devices") accessible via a network (e.g., the Internet). The client-side software 110 may include web infrastructure modeling applications 120 that operate within a virtual environment (e.g., a browser sandbox) provided by a web browser 121 (e.g., a Chrome® web browser), desktop infrastructure modeling applications 122 that operate under a desktop operating system (e.g., a Windows® operating system) and include an embedded web browser (e.g., a Chromium® browser) 123, and mobile infrastructure modeling applications 124 that operate under a mobile operating system (e.g., an iOS® or Android® operating system) that include a script engine (e.g., a JavaScript engine) 125. The infrastructure modeling applications 120, 122, 124 may utilize open-source frontend modules 130 and backend modules 132 built from an open-source repository of the platform and a proprietary visualization mode 134 built from a private repository, the functions of which are discussed in more detail below.

For each type of application 120, 122, 124, the frontend modules 130 are shown as part of client-side software 110. For desktop applications 122 and mobile applications 124, the backend modules 132 and visualization modules 134 are shown as part of client-side software 110, resident on a client device and accessible to the frontend module 130 via inter-process communication (IPC) or function calls. For web applications 120, the backend modules 132 and visualization modules 134 are shown as part of cloud-based software 112, executing on a virtual machine 135 on a cloud computing device and communicating with the frontend module 130 via remote procedure calls (RPCs) over HyperText Transfer Protocol Secure (HTTPS). It should be understood that in alternative embodiments, frontend modules 130, backend modules 132 or visualization modules 134 may be disposed in a variety of different locations, and the arrangement shown in FIG. 1 are merely an example. Further, it should be understood that in alternative embodiments, multiple frontend modules 130 may interact with the same backend module 132 and/or visualization module 134, and there need not be a one-to-one correspondence between a frontend module 130, backend module 132 and visualization module 134.

Infrastructure modeling services 150 may be at the core of the cloud-based software 112. Such services software may provide centralized management and synchronization support for infrastructure models. Infrastructure modeling services 150 may interact with a number of other services (not shown) in the cloud that perform information management and support functions. For example, information management services may manage asset data, project data, reality data, Internet of Things (IoT) data, codes, and other functionality.

Working with infrastructure modeling services 150, the open-source frontend modules 130 and backend modules 132, and the proprietary visualization modules 134 of applications 120, 122, 124 may operate to enable a user to access, modify, display, and otherwise interact with infrastructure models. The frontend modules 130 may be primarily concerned with user interaction, information presentation and the like. They may access data for such tasks by making requests to the backend modules 132. The backend modules 132 may be primarily concerned with servicing requests from the frontend modules 130 and performing task related to administration, data synchronization, interacting with components of infrastructure models such as elements, working with local file systems and the like. The visualization modules 134 may be primarily concerned with tile-based and/or non-tile-based graphics processing of infrastructure models and providing the results.

At runtime, a backend module 132 may call an exposed function of a DLL that returns a pointer to a binary implementation of the visualization module 134 (a proprietary binary). Subsequently, when graphics of an infrastructure model are required, the backend module 132 may utilize the pointer to request tile-based and/or non-tile-based processing from the visualization module 134. For tile based processing, the request may ask for graphics from elements intersecting the volume of a tile within a tile tree, for example, identified by a tile identifier (ID). For non-tile-based processing, the request may ask for graphics for a set of elements, for example, each identified by an element ID, or a sequence of underlying symbology and geometric primitives, for example, specified by a data exchange format (e.g., a JSON (JavaScript Object Notation) data exchange format) or binary stream. The visualization module 134 accepts and processes requests, subsequently either returning processed graphics or an error, or having the request cancelled before it completes. The processed graphics may be returned as a binary blob of a predetermined graphics format (e.g., an "iMdl" format or another graphics format). The returned graphics may be stored in a local cache at the backend module 132 or an external cache, for example, a cloud storage account (not shown), and then provided to/accessed by a frontend module 130 for display to a user.

Figure 2:
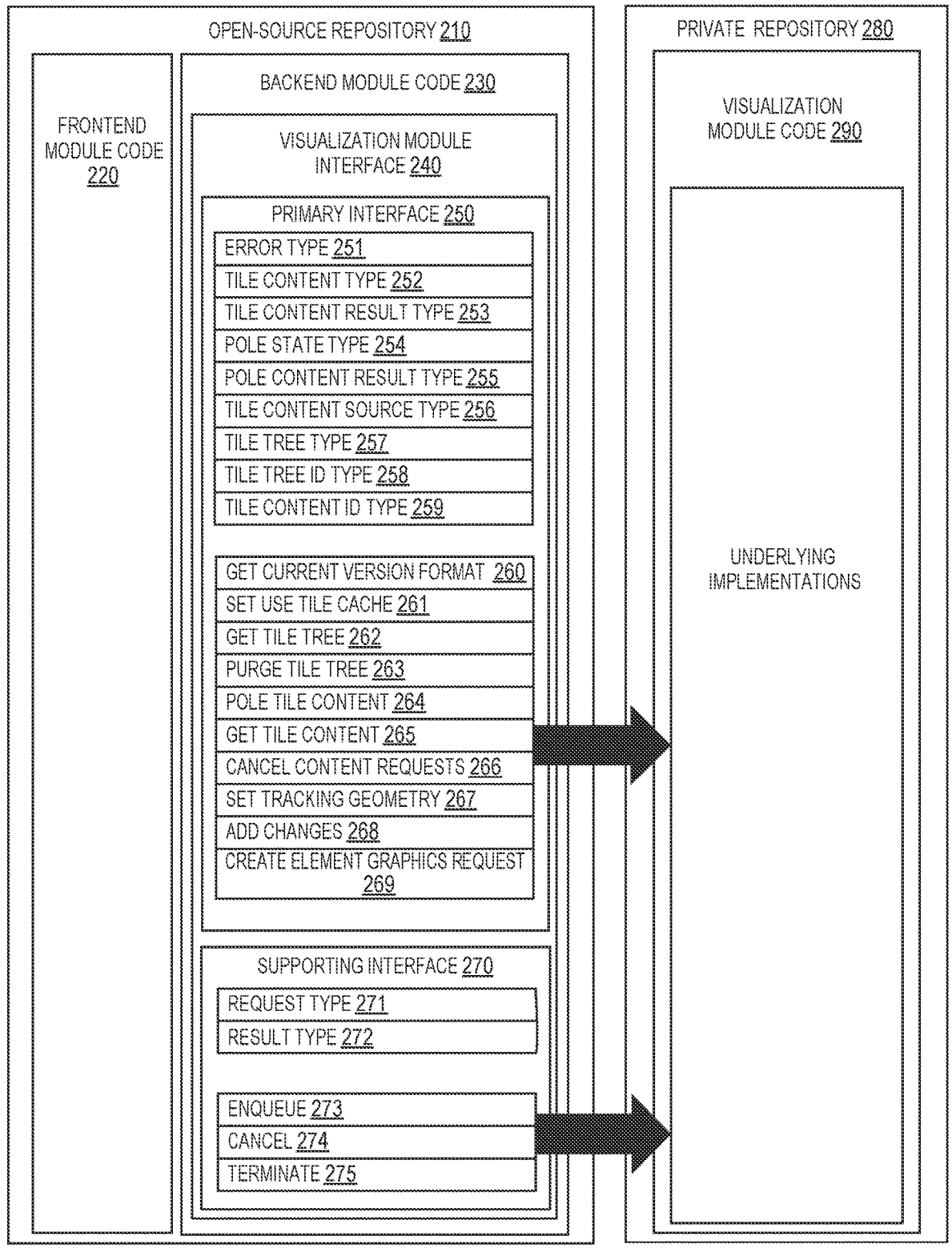
FIG. 2 is a block diagram illustrating an example open-source repository and private repository and code components that may be maintained therein.

A frontend module 130 and backend module 132 may be built from code of an open-source repository, and a visualization module 134 may be built from code of a private repository, maintained on a client-side or cloud-based computing device. FIG. 2 is a block diagram illustrating an example open-source repository 210 and private repository 280 and code components that may be maintained therein. The open-source repository 210 may hold frontend module code 220 and backend module code 230. The private repository 280 may hold visualization module code 290. It should be understood that a variety of other code (not shown) may also be held in the repositories 210, 280 until built into binaries. Further, while certain interfaces, types, operations, and implementations of objects are discussed below, it should be understood that the frontend module code 220, backend module code 230 and visualization module code 290 may support a wide variety of additional interfaces, types, operations, and implementations of objects (not shown).

Pertinent to the present disclosure, the backend module code 230 may include a visualization module interface 240. The visualization module interface 240 may be divided into a primary interface 250 for tile-based processing of graphics and a supporting interface 270 for non-tile-based processing of graphics.

The primary interface 250 may define a number of concrete types, including an Error type 251, a Tile Content type 252, a Tile Content Result type 253, a Pole State type 254, a Pole Content Result type 255, a Tile Content Source type 256, a Tile Tree type 257, a Tile Tree ID type 258, and a Tile Content ID type 259.

The Error type 251 is a concrete type that permits one of an enumerated set of values that indicate kinds of errors that may occur during processing of a request by the visualization module 134. For example, a request for the visualization module 134 to obtain a tile tree for a non-existent infrastructure model may produce a Bad Model error code.

The Tile Content type 252 is a concrete type that permits a binary blob (e.g., conforming to an iMdl or other graphics format) including processed graphics. The processed graphics in the blob may be deserialized for display. The Tile Content type 252 is a concrete type that permits an indication that the result of processing is an error or processed graphics.

The Tile Content Result type 253 is a concrete type that permits an indication of an error or processed graphics.

The Pole State type 254 is a concrete type that permits one of an enumerated set of values representing current processing state of a request. The processing states may include, for example, a new state indicating that the request has been newly-enqueued for processing at the visualization module 134, a pending state indicating that the request remains in the queue at the visualization module 134 but is not yet actively being processed, and a loading state indicating that the request is actively being processed by the visualization module 134.

The Pole Content Result type 255 is a concrete type that permits an indication of current processing state, processed graphics, or an error.

The Tile Content Source type 256 is a concrete type that permits an indication of a method by which the frontend module 130 may retrieve processed graphics returned by the visualization module 134. For example, two methods may be provided: an external cache and a local cache. With an external cache, the processed graphics are uploaded by the visualization module 134 to a predetermined external storage location, for example, a cloud storage account, and a frontend module 130 retrieves the graphics directly therefrom. With a local cache, the backend module 132 maintains its own cache on the computing device on which it is executing, and the backend module 132 provides the graphics to the frontend module 130 from the cache.

The Tile Tree type 257 is a concrete type that permits a description (e.g., a JSON object) of a tile tree to which the tile whose graphics are being requested belongs. As discussed above, a tile tree often is organized with a single root tile representing the entire volume (but at the lowest LOD), and child multiple tiles one or more subsequent levels under the root representing smaller volumes (but at greater LOD). The description (e.g., JSON object) may include a Tile Tree ID that includes an encoded identity of the tile tree. An infrastructure model may have multiple distinct tile trees of different discrete types with different customizations applied, and the Tile Tree ID may distinguish therebetween. The description may also include a number of tiles in the tile tree for which all but one child tile are empty (which may be useful in optimizing tile selection), a version of the predetermined format (e.g., the iMdl format or another format) used for graphics of tiles, a maximum size in pixels that tiles can occupy when displayed without exhibiting unacceptable geometric inaccuracy, and a transform of a coordinate space used by the tile tree to spatial coordinates. The description may further include a bounding box that encloses actual geometry represented in the tile tree, and a string qualifying the Tile Tree ID that encodes information that influences the content of tiles produced therefrom. The description may additionally include a globally unique identifier (GUID) corresponding to the contents of the infrastructure model at the time the tile tree was created, which may be used to determine when changes to the infrastructure model render the tile tree out of date, mappings used with rigid body transforms, and a description of the root tile of the tile tree.

The Tile Tree ID type 258 is a concrete type that permits a string encoding information used to interpret the description of the tile tree (Tile Tree ID) and the data contained therein.

The Tile Content ID type 259 is a concrete type that permits a string encoding information used to process graphics for the tile, specifying the sub-volume occupied by the tile and parameters dictating how graphics are to be produced and encoded. A given tile can yield multiple distinct graphics depending on these parameters.

The primary interface 250 may also have a number of operations including a Get Current Version Format operation 260, a Set Use Tile Cache operation 261, a Get Tile Tree operation 262, a Purge Tile Tree operation 263, a Pole Tile Content operation 264, a Get Tile Content operation 265, a Cancel Content Requests operation 266, a Set Tracking Geometry operation 267, an Add Changes operation 268 and a Create Element Graphics Requests operation 269. While the operations 260-269 are shown in FIG. 2 in the backend module code 230 of the open-source repository 210, it should be understood that the implementation of the objects corresponding to the operations are proprietary and maintained in the visualization module code 290 of the private repository 280.

The Get Current Version Format operation 260 provides a maximum version of the graphics format (the iMdl format or another format) understood by the visualization module 134. In one embodiment, each version is identified by an integer version number and is backwards, but not forwards, compatible. By obtaining the maximum version that the visualization module 134 understands, the frontend module 130 and backend module 132 can establish a globally intelligible version of the format to utilize.

The Set Use Tile Cache operation 261 accepts a Boolean value to enable or disable use of a local cache at the backend module 132. A frontend module 130 may repeatedly request the same graphics (e.g., because it discards them after some period of disuse). When local caching is enabled, the backend module 132 first attempts to fulfill incoming requests from the local cache. If the graphics are not found in the local cache, the backend module 132 may request processing of graphics by the visualization module 134, add the processed graphics to the local cache, and then service the request. In one implementation, the local cache may be a relational database (e.g., an SQLite database). The primary key for a cache entry in such a database may be an encoding of the Tile ID, Tile Tree ID and GUID corresponding to the contents of the infrastructure model at the time the tile was created, such that "stale" tiles can be identified and rejected if the contents of the tile have changed since it was generated.

The Get Tile Tree 262 operation obtains a current description of a tile tree. It may accept a Tile Tree ID and a Boolean indicating whether or not to instantiate the tile tree if it does not already exist. The information may be used to determine what tiles to request graphics for.

The Purge Tile Trees operation 263 removes (evicts) extant tile trees from memory. It may accept a list of infrastructure models, such that it may evict tile trees associated with those specified infrastructure models. Alternatively, it may evict all tile trees. Before eviction it may await cancellation of pending requests for the tile trees.

The Pole Tile Content operation 264 enqueues and subsequently returns results/status of a request for processing graphics for a tile. It may accept a Tile Tree ID and a Tile Content ID describing the requested graphics. If the request does not already exist, it may enqueue one. The Pole Tile Content operation 264 may also return a variety of items depending on the status. If the request has completed, it may return a Tile Content. If the request was just enqueued, it may return a Poll State indicating a new state. If the request remains in the queue, it may return a Poll State indicating a pending state. If the request is actively being processed, it may return a Poll State indicating a loading state. If the request cannot be processed, it may return an error.

The backend module 132 may invoke the Pole Tile Content operation 264 on behalf of one or more frontend modules 130 periodically. The visualization module 134 may process the request and produce graphics. In one embodiment, the visualization module may use techniques described in U.S. Pat. No. 11,113,847, titled "Conversion of Infrastructure Model Geometry to a Tile Format" by Connelly et al. to produce the graphics. The contents of such patent are incorporated by reference herein in their entirety. After a request is completed, it may provide to a frontend module 130 a Tile Content Source value describing the method by which the graphics can be retrieved (e.g., from a local cache or external cache). If the request produces an error, the error may be returned instead.

The Get Tile Content operation 265 fetches graphics for a specific tile from the local cache or produces graphics for the specific tile if not obtainable in the local cache. It may accept a Tile Tree ID and a Tile Content ID describing the requested graphics. Typically, the Set Use Tile Cache operation 261 will have been previously invoked to enable use of the local cache, and the Pole Tile Content operation 264 previously invoked to produce graphics and write them to the local cache. If the graphics were removed (evicted) from the local cache after the Poll Tile Content operation 264, the Get Tile Content operation 265 may regenerate the graphics.

The Cancel Content Requests operation 266 cancels the request for processing graphics. It may accept a Tile Tree ID and one or more Tile Content IDs and cancel in progress or pending requests. A user may navigate a view of an infrastructure model such that the set of tiles needed to render the view changes over time. As there is some delay in rendering the view, the frontend module 130 may request graphics from the backend module 132 for a particular tile, but then determine before the request is completed that the graphics are no longer needed. The Cancel Content Requests operation 266 may provide notification that the graphics are no longer needed to prevent wasted processing and free up resources to be used to process newer requests.

The Set Tracking Geometry operation 267 toggles tracking of changes to geometry contained within the infrastructure model. It may accept the infrastructure model and a Boolean flag indicating whether tracking should be enabled or disabled. When an infrastructure model is being interactively viewed and its contents modified, each modification potentially invalidates a number of previous-generated tiles, including those currently displayed by the frontend module 130. Without tracking, to keep the display up-to-date with the infrastructure model's contents, new tiles are requested after each modification, which may be a resource expensive and time-consuming operation. By enabling tracking of geometry changes while modifications are underway, a frontend module 130 can continue to display previously requested tiles, while obtaining and displaying up-to-date graphics for just those elements that have changed, improving performance. Further details may be found in U.S. Patent Application Publication No. 2022/0076503, titled "Visualization of Massive 3D Models in Interactive Editing Workflows" by Connelly et al. The contents of such patent are incorporated by reference herein in their entirety.

The Add Changes operation 268 updates state to record additions, deletions and/or modifications of elements with an infrastructure model. It may be invoked if the Set Tracking Geometry operation 267 has toggled on geometry tracking. While geometry is being tracked, transactions may invoke the Add Changes operation 268, supplying the infrastructure model and the set of elements IDs of added, deleted and/or modified elements. Separately, the same information may also be reported to a frontend module 130 so it can request up-to-date graphics for added or modified elements, and so it can suppress display of deleted elements. Further details may be found in U.S. Patent Application Publication No. 2022/0076503, titled "Visualization of Massive 3D Models in Interactive Editing Workflows" by Connelly et al.

The Create Element Graphics Requests operation 269 provides an implementation of the supporting interface 270 to manage requests for non-tile-based graphics processing.

The supporting interface 270 may define a number of concrete types, including a Request type 271 and a Results type 272. The Request type 271 is a concrete type that permits a description of the source of geometry (e.g., an element ID or a geometry stream), a unique request ID and parameters specifying how the geometry is to be converted into graphics. The Results type 272 is a concrete type that permits an object (e.g., a JavaScript Promise object) that resolves asynchronously to a binary blob (e.g., conforming to the iMdl or other graphics format) including processed graphics or an error.

The supporting interface 270 also has a number of operations including an Enqueue operation 273, a Cancel operation 274 and a Terminate operation 275. While the operations 273-275 are shown in FIG. 2 in the backend module code 230 of the open-source repository 210, it should be understood that the implementation of the objects corresponding to the operations are maintained in the visualization module code 290 of the private repository 280.

The Enqueue operation 273 adds the request for processing graphics to a queue awaiting processing. A mapping may be maintained between the unique request ID and scheduled tasks. Tasks may be allocated onto a fixed size thread pool to be executed in the order in which they are received as threads become available. A check may first be performed if a task corresponding to the supplied unique request ID has already been enqueued. If not, one is enqueued and added to the mapping. It then returns an object (e.g., a JavaScript Promise object) that resolves asynchronously when the scheduled task finishes executing. The graphics may be produced from the geometry using techniques similar to those described herein for use with tile graphics. When a task begins executing on a thread, a Boolean cancellation flag may be periodically checked and if found set, the processing ceased. After the task finishes executing on a thread, it may be removed from the mapping.

The Cancel operation 274 cancels a request for processing graphics. It may accept one or more unique request IDs and cancel any previously scheduled tasks associated with those IDs. Sometimes changes in view cause graphics that were previously requested, but not yet received, to now be unnecessary. The scheduled tasks for such graphics may be located by their unique request ID and a Boolean cancellation flag for each task set as cancelled.

The Terminate operation 275 cancels all requests in the queue previously scheduled by the Enqueue operation 273. The operation may be invoked when an infrastructure model is about to be closed to ensure that no tasks attempt to access the infrastructure model in background threads after it is closed. This may be performed by setting the Boolean cancellation flag for each task in the mapping and waiting until mapping has become empty, indicating all processing has ceased.

Figure 3:
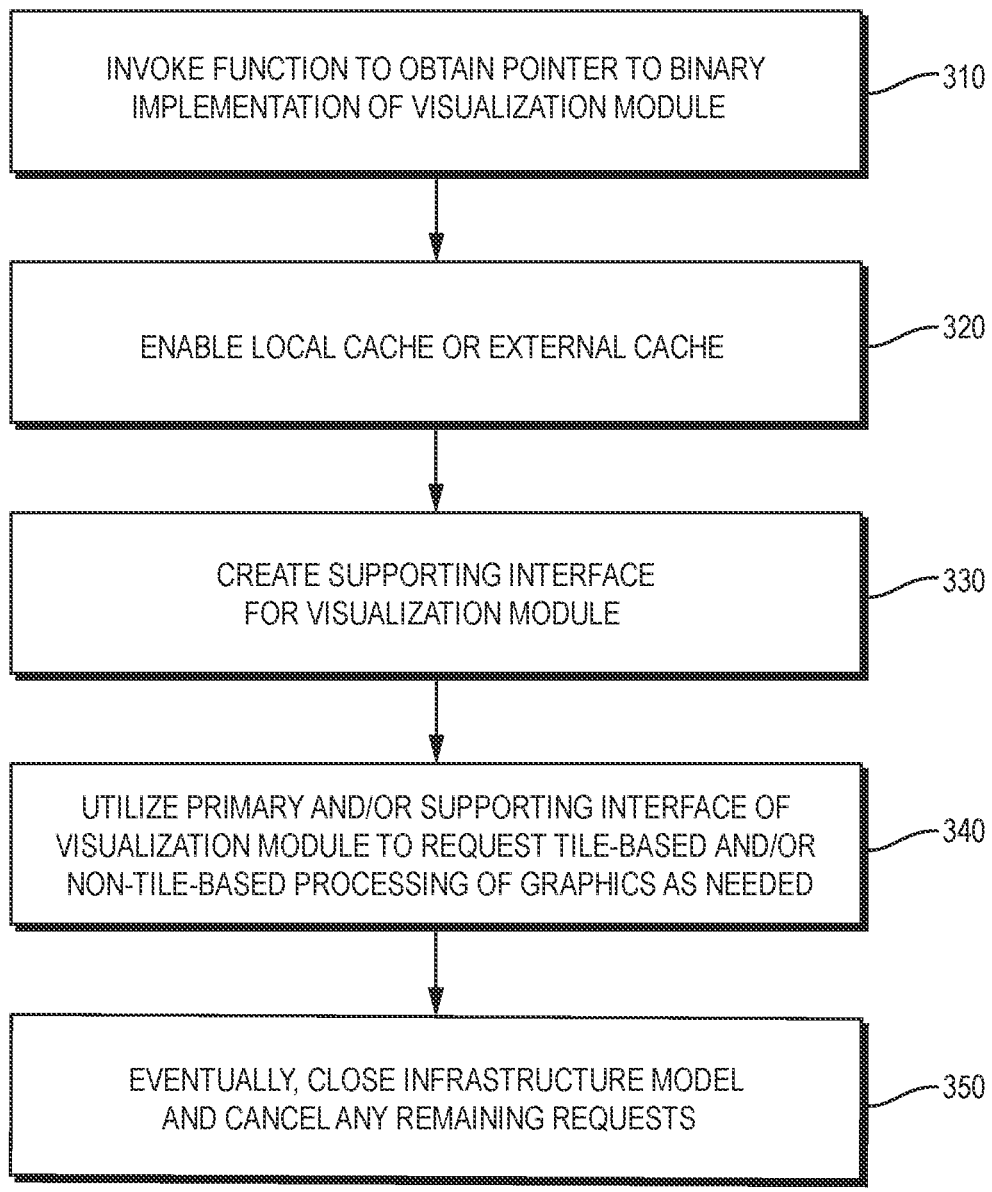
FIG. 3 is a flow diagram of an example sequence of steps for rendering an infrastructure model within an open-source infrastructure modeling platform, wherein a proprietary implementation of tile-based and/or non-tile-based graphics processing is provided as a binary at run-time.

FIG. 3 is a flow diagram of an example sequence of steps 300 for rendering an infrastructure model within an open-source infrastructure modeling platform, wherein a proprietary implementation of tile-based and/or non-tile-based graphics processing is provided as a binary at run-time. At step 310, which is performed at initialization, a backend module 132 invokes a function (e.g., a visualization create function) of a DLL to obtain a pointer to a binary implementation of the visualization module 134 built from a private repository. The pointer may be stored by the backend module 132 until the backend module terminates.

At step 320, the backend module 132 invokes the Set Use Tile Cache operation 162 to enable a local cache at the backend module, or to indicate an external cache is to be used.

Subsequently, the backend module 132 may open an infrastructure model. In response to opening the infrastructure model, at step 330, the backend module 132 may invoke the Create Element Graphics Requests operation 269 to create the supporting interface.

At step 340, in response to the frontend module's need for graphics, the backend module 132 utilizes the primary and/or supporting interface 270 of the visualization module 134 with the pointer to request tile-based and/or non-tile-based processing of graphics. Each request may include an identification of a set of elements that intersect a volume of a tile, identification of a set of elements, or an identification of a symbology and geometric primitives, depending on its exact nature. Processed graphics from the visualization module are received at the backend module 132 or into external storage and provided to the frontend module 130 for display to a user. If the request is for tile-based processing and a local cache is enabled, steps 400 shown in FIG. 4 may be performed as part of step 340. If the request is for tile-based processing and external storage is to be used, steps 500 shown in FIG. 5 may be performed as part of step 340. If the request is for non-tile-based processing, steps 600 shown in FIG. 6 may be performed as part of step 340.

Eventually, the backend module 132 may close the infrastructure model. In response to closing the infrastructure model, at step 350, the backend module 132 may cancel all requests.

Figure 4:
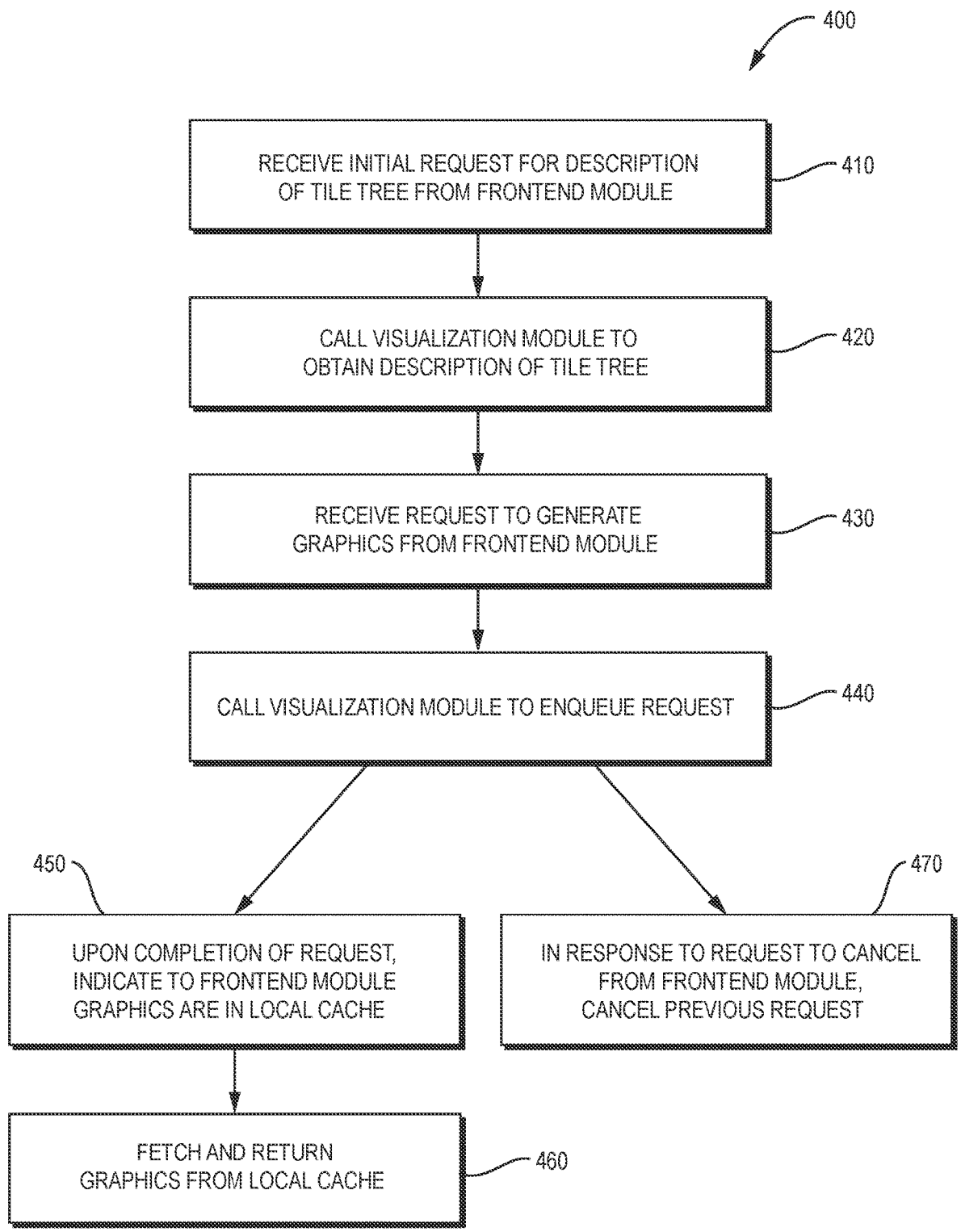
FIG. 4 is a flow diagram of an example sequence of steps for tile-based processing when a local cache is enabled, which may be performed as part of FIG. 3.

FIG. 4 is a flow diagram of an example sequence of steps 400 for tile-based processing when a local cache is enabled, which may be performed as part of step 340 of FIG. 3. At step 410, the backend module 132 receives from the frontend module 130 an initial request for the description of a tile tree. At step 420, the backend module 132 calls the Get Tile Tree operation 262 of the visualization module 134 on the frontend module's behalf to obtain the description of the tile tree (e.g., as a JSON object). At step 430, the backend module 132 receives from the frontend module 130 a subsequent request to generate graphics for a tile in the tile tree. At step 440, the backend module 132 calls the Poll Tile Content operation of the visualization module 134 to enqueue and subsequently return status of the request for processing graphics. At step 450, upon completion of the request, the backend module 132 may indicate to the frontend module 130 that the graphics are in the local cache at the backend module 132 using the Tile Content Source type 256. At step 460, in response to a request for the graphics from the frontend module 130, the backend module 132 fetches and returns the graphics for the tile from the local cache using the Get Tile Content operation 265. Alternatively, at step 470, in response to a request to cancel from the frontend module 130, the backend module 132 cancels the previous request using the Cancel Content Requests operation 266. Steps 430-470 may be repeated indefinitely if the frontend module 130 has additional requests.

Figure 5:
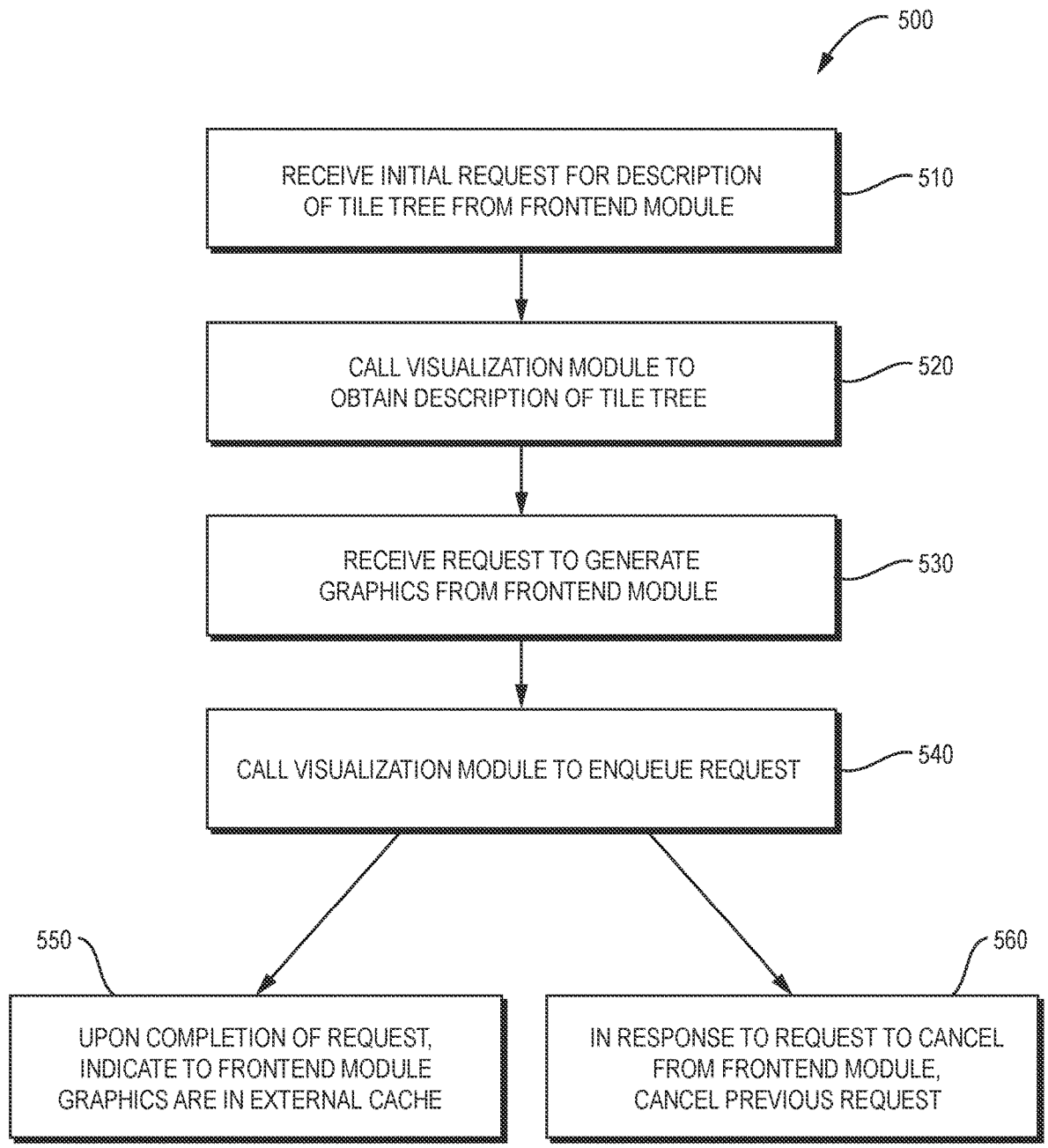
FIG. 5 is a flow diagram of an example sequence of steps for tile-based processing when an external cache is utilized, which may be performed as part of FIG. 3.

FIG. 5 is a flow diagram of an example sequence of steps 500 for tile-based processing when an external cache is utilized, which may be performed as part of step 340 of FIG. 3. At step 510, the backend module 132 receives from the frontend module 130 an initial request for the description of a tile tree (e.g., as a JSON object). At step 520, the backend module 132 calls the Get Tile Tree operation 262 of the visualization module 134 on the frontend module's behalf to obtain the description of the tile tree. At step 530, the backend module 132 receives from the frontend module 130, a subsequent request to generate graphics for a tile in the tile tree. At step 540, the backend module 132 calls the Poll Tile Content operation of the visualization module 134 to enqueue and subsequently return status of the request for processing graphics. At step 550, upon completion of the request, the backend module 132 may indicate to the frontend module 130 that the graphics are in the external cache using the Tile Content Source type 256. Thereafter, the frontend module 130 fetches the graphics from the external cache separate from the backend module 132. Alternatively, at step 560, in response to a request to cancel from the frontend module 130, the backend module 132 cancels the previous request using the Cancel Content Requests operation 266. Steps 530-560 may be repeated indefinitely if the frontend module 130 has additional requests.

Figure 6:
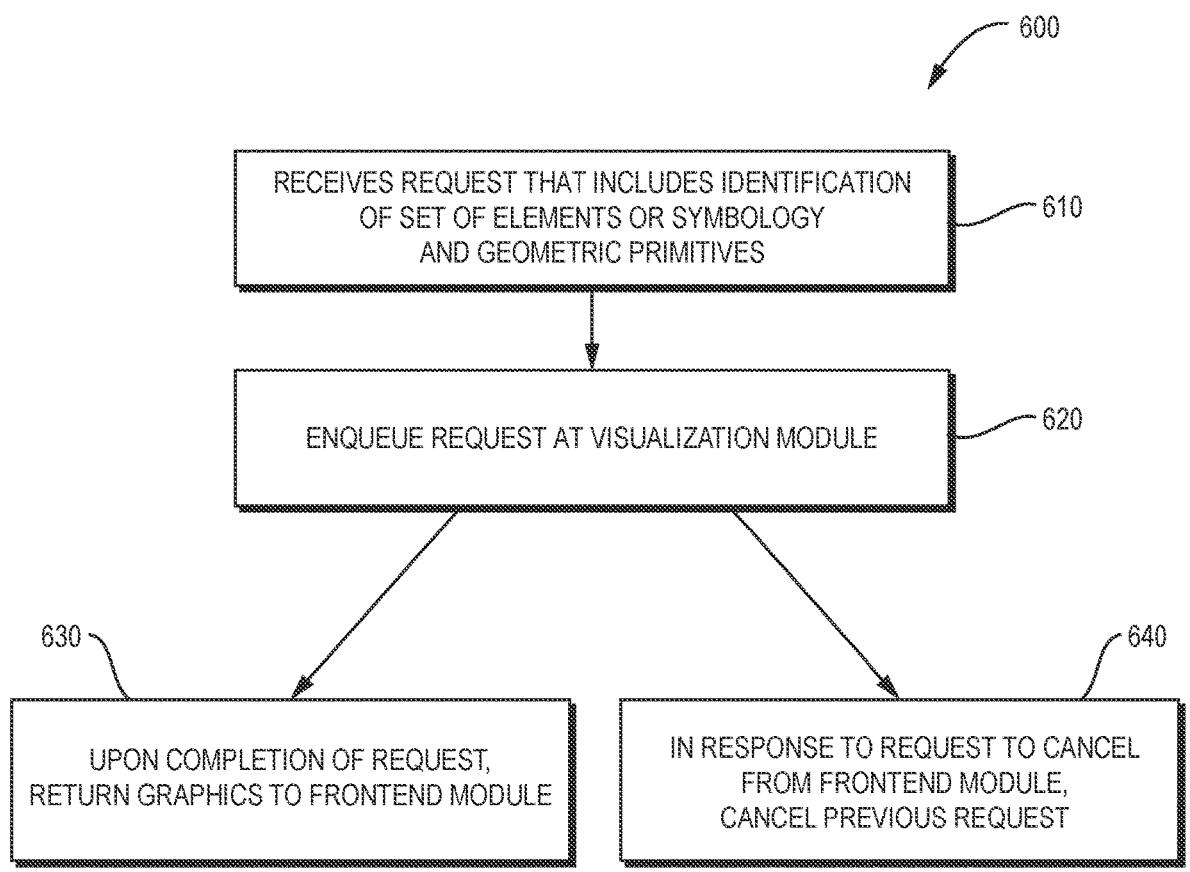
FIG. 6 is a flow diagram of an example sequence of steps for non-tile-based processing, which may be performed as part of FIG. 3.

FIG. 6 is a flow diagram of an example sequence of steps 600 for non-tile-based processing, which may be performed as part of step 340 of FIG. 3. At step 610, the backend module 132 receives from the frontend module 130 a request to generate graphics that include identification of a set of elements, or identification of a symbology and geometric primitives. At step 620, the backend module 132 calls the Enqueue operation 272 of the supporting interface 270 of the visualization module 134 to enqueue a request for graphics for the set of elements or a symbology and geometric primitives. The results of the request are promised to be placed in the Results type 272. At step 630, upon completion of the request the promise resolves, and the backend module 132 returns the graphics to the frontend module 130. Alternatively, at step 640, in response to a request to cancel from the frontend module 130, the backend module 132 cancels the previous request using the Cancel operation 273. Steps 610-640 may be repeated indefinitely if the frontend module 130 has additional requests.

In summary, techniques are provided that supply a proprietary implementation of tile-based and/or non-tile-based graphics processing as a binary at run-time for use in an open-source infrastructure modeling platform. It should be understood that a wide variety of adaptations and modifications may be made to the techniques to suit various implementations and environments. While it is discussed above that aspects of the techniques can be implemented by specific software executing on specific hardware, it should be understood that the techniques may also be implemented by different software, different hardware, or various different combinations thereof. Software may include instructions in a high-level programming language or low-level programming language that may be stored and compiled or interpreted to run on hardware. For example, instructions may be stored on a non-transitory electronic device readable medium and when executed on one or more processors may be operable to perform the above techniques.

It should be understood that the ordering of any method steps discussed above may be changed to suit various situations or requirements. Absent an explicit indication to the contrary, the order of steps described above may be modified such that a subsequent step occurs before a preceding step, or in parallel to such step.

Above all, it should be understood that the above descriptions are meant to be taken only by way of example. Numerous variations, additions, omissions, and other modifications will be apparent to one of ordinary skill in the art, and such variations, additions, omissions, and other modifications should be considered within the scope of this disclosure. Thus, while example embodiments are shown and described, it will be apparent to those skilled in the art that changes and modifications may be made therein 10 without departing from the spirit and scope of this disclosure.

What is claimed is:

1. A method for rendering an infrastructure model within an open-source infrastructure modeling platform, comprising:

calling, by a backend module of an open-source infrastructure modeling platform executing on a client device or one or more cloud computing devices, a function of a dynamically loaded module (DLL) to obtain a pointer to an implementation of a visualization module built from a private repository that implements tile-based graphics processing;

determining a need to render graphics for at least a portion of the infrastructure model, wherein the determining the need to render graphics comprises:
   receiving, by the backend module from the frontend module, an initial request for the description of a tile tree to which a tile belongs,
   calling, by the backend module, the visualization module to obtain the description of the tile tree,
   receiving, by the backend module from the frontend module, a subsequent request to generate graphics for a tile in the tile tree;
utilizing, by the backend module, an interface of the visualization module with the pointer to request tile-based processing of graphics by the implementation, wherein the request includes an identification of a set of elements that intersect a volume of the tile; and
receiving processed graphics produced by the visualization module at a frontend module of the open-source infrastructure modeling platform for display to a user.

2. The method of claim 1, wherein the graphics are received into a local cache at the backend module, and the providing the graphics to a frontend module further comprises:
   enqueueing and returning status of the request for processing graphics;
   upon completion of the request for processing graphics, providing an indication the graphics are in the local cache to the frontend module; and
   fetching, by the backend module, the graphics for the tile from the local cache.

3. The method of claim 1, wherein the graphics are received into an external cache separate from the backend module, and the providing the graphics to a frontend module further comprises:
   enqueueing and returning status of the request for processing graphics;
   upon completion of the request for processing graphics, providing an indication the graphics are in the external cache to the frontend module; and
   fetching, by the frontend module, the graphics for the tile from the external cache.

4. The method of claim 1, wherein the request for processing graphics requests non-tile-based processing and includes identification of a set of elements, or identification of a symbology and geometric primitives, and the determining the need to render graphics further comprises:
   receiving, by the backend module from the frontend module, identification of the set of elements or identification of the symbology and geometric primitives.

5. The method of claim 4, wherein the graphics are received by the backend module and provided by the backend module to the frontend module.

6. A method for rendering an infrastructure model within an open-source infrastructure modeling platform, comprising:
   calling, by a backend module of an open-source infrastructure modeling platform executing on a client device or one or more cloud computing devices, a function of a dynamically loaded module (DLL) to obtain a pointer to an implementation of a visualization module built from a private repository that implements tile-based graphics processing and non-tile-based graphics processing;
   determining a need to render graphics for at least a portion of the infrastructure model;
   utilizing, by the backend module, an interface of the visualization module with the pointer to request tile-based and/or non-tile-based processing of graphics by the implementation, wherein the interface of the visualization module includes a primary interface for tile-based graphics processing and a supporting interface for non-tile-based graphics processing, and the request includes at least one of an identification of a set of elements that intersect a volume of a tile, identification of a set of elements, or an identification of a symbology and geometric primitives; and
   receiving processed graphics produced by the visualization module at a frontend module of the open-source infrastructure modeling platform for display to a user.

7. The method of claim 6, wherein the primary interface includes one or more types selected from the group consisting of:
   an Error type for an indication of kinds of errors that may occur during processing of a request by the visualization module;
   a Tile Content type for storing the graphics;
   a Pole State type for an indication of results/status of the request for processing graphics;
   a Tile Content Source type for an indication of a method by which the frontend module may retrieve graphics returned by the visualization module;
   a Tile Tree type for a description of a tile tree to which the tile belongs;
   a Tile Tree Identifier type for information used to interpret the description of the tile tree in order to identify a particular tile tree; and
   a Tile Content Identifier type for information used to describe the graphics to be produced from the tile within the tile tree.

8. The method of claim 7, wherein the primary interface includes one or more operations selected from the group consisting of:
   a Get Current Version Format operation that provides a maximum version of graphics format understood by the visualization module;
   a Set Use Tile Cache operation that enables or disables use of a local cache at the backend module;
   a Get Tile Tree operation that obtains a current description of a tile tree;
   a Purge Tile Tree operation that removes extant tile trees from memory;
   a Pole Tile Content operation that returns results/status of the request for processing graphics;
   a Get Tile Content operation that fetches graphics for a specific tile or produces graphics for the specific tile;
   a Cancel Content Requests operation that cancels the request for processing graphics;
   a Set Tracking Geometry operation that toggles tracking of changes to geometry contained within the infrastructure model; and
   an Add Changes operation that updates state to record addition, deletion and/or modification of elements with the infrastructure model.

9. The method of claim 7, wherein the supporting interface includes one or more types selected from the group consisting of:
   a Request type for description of source of geometry, a unique request ID and parameters specifying how the geometry is to be converted into graphics; and
   a Results type for an object that resolves asynchronously to the graphics or an error.

10. The method of claim 7, wherein the supporting interface includes one or more operations selected from the group consisting of:

an Enqueue operation that adds the request for processing graphics to a queue awaiting processing;
a Cancel operation that cancels the request for processing graphics; and
a Terminate operation that cancels all requests in the queue.

11. The method of claim 6, wherein the request for processing graphics requests tile-based processing and includes identification of a set of elements that intersect a volume of a tile, and the determining the need to render graphics further comprises:
receiving, by the backend module from the frontend module, an initial request for the description of a tile tree to which the tile belongs;
calling, by the backend module, the visualization module to obtain the description of the tile tree; and
receiving, by the backend module from the frontend module, a subsequent request to generate graphics for a tile in the tile tree.

12. The method of claim 11, wherein the graphics are received into a local cache at the backend module, and the providing the graphics to a frontend module further comprises:
enqueueing and returning status of the request for processing graphics;
upon completion of the request for processing graphics, providing an indication the graphics are in the local cache to the frontend module; and
fetching, by the backend module, the graphics for the tile from the local cache.

13. The method of claim 11, wherein the graphics are received into an external cache separate from the backend module, and the providing the graphics to a frontend module further comprises:
enqueueing and returning status of the request for processing graphics;
upon completion of the request for processing graphics, providing an indication the graphics are in the external cache to the frontend module; and
fetching, by the frontend module, the graphics for the tile from the external cache.

14. The method of claim 6, wherein the request for processing graphics requests non-tile-based processing and includes identification of a set of elements, or identification of a symbology and geometric primitives, and the determining the need to render graphics further comprises:
receiving, by the backend module from the frontend module, identification of the set of elements or identification of the symbology and geometric primitives.

15. A non-transitory electronic device readable medium having instructions stored thereon for an open-source infrastructure modeling platform, wherein the instructions when executed by one or more processors of one or more computing devices are operable to:
call a function to obtain a pointer to an implementation of a visualization module built from a private repository that implements tile-based graphics processing;
determine a need to render graphics for at least a portion of the infrastructure model by:
receiving an initial request for the description of a tile tree to which a tile belongs,
calling the visualization module to obtain the description of the tile tree, and
receiving a subsequent request to generate graphics for the tile in the tile tree;
utilize an interface of a visualization module with the pointer to request tile-based processing of graphics by the implementation, wherein the request includes at least an identification of a set of elements that intersect a volume of the tile; and
receive graphics for display.

16. The non-transitory electronic device readable medium of claim 15, wherein the graphics are received into a local cache, and the instructions when executed are further operable to:
enqueue and return status of the request for processing graphics;
upon completion of the request for processing graphics, provide an indication the graphics are in the local cache; and
fetch the graphics for the tile from the local cache.

17. The non-transitory electronic device readable medium of claim 15, wherein the graphics are received into an external cache, and the instructions when executed are further operable to:
enqueue and return status of the request for processing graphics;
upon completion of the request for processing graphics, provide an indication the graphics are in the external cache; and
fetch the graphics for the tile from the external cache.

18. The non-transitory electronic device readable medium of claim 15, wherein the implementation of the visualization module also implements non-tile-based graphics processing of graphics, and the instructions when executed are further operable to:
utilize the interface of the visualization module with the pointer to request non-tile-based processing of graphics by the implementation, wherein the request for non-tile-based processing of graphics includes identification of a set of elements, or identification of a symbology and geometric primitives; and
receive additional graphics for display.

19. The non-transitory electronic device readable medium of claim 15, wherein the interface of the visualization module includes a primary interface for tile-based graphics processing, and the primary interface includes one or more types selected from the group consisting of:
an Error type for indication of kinds of errors that may occur during processing of a request by the visualization module;
a Tile Content type for storing the graphics;
a Pole State type for an indication of status of the request for processing graphics;
a Tile Content Source type for an indication of a method by which the frontend module may retrieve graphics returned by the visualization module;
a Tile Tree type for a description of a tile tree to which the tile belongs;
a Tile Tree Identifier type for information used to interpret the description of the tile tree in order to identify a particular tile tree; and
a Tile Content Identifier type for information used to describe the graphics to be produced from the tile within the tile tree.

20. The non-transitory electronic device readable medium of claim 15, wherein the interface of the visualization module includes a primary interface for tile-based graphics processing, and the primary interface includes one or more operations selected from the group consisting of:
a Get Current Version Format operation that provides a maximum version of graphics format understood by the visualization module;

a Set Use Tile Cache operation that enables or disables use of a local cache at the backend module;

a Get Tile Tree operation that obtains a current description of a tile tree;

a Purge Tile Tree operation that removes extant tile trees from memory;

a Pole Tile Content operation that returns status of the request for processing graphics;

a Get Tile Content operation that fetches graphics for a specific tile from or produces graphics for the specific tile;

a Cancel Content Requests operation that cancels the request for processing graphics;

a Set Tracking Geometry operation that toggles tracking of changes to geometry contained within the infrastructure model; and an Add Changes operation that updates state to record addition, deletion and/or modification of elements with the infrastructure model.

21. The non-transitory electronic device readable medium of claim 18, wherein the interface of the visualization module includes a supporting interface for non-tile-based graphics processing, and the supporting interface includes one or more types selected from the group consisting of:

a Request type for description of source of geometry, a unique request ID and parameters specifying how the geometry is to be converted into graphics; and a Results type for an object that resolves asynchronously to the graphics or an error.

22. The non-transitory electronic device readable medium of claim 18, wherein the interface of the visualization module includes a supporting interface for non-tile-based graphics processing, and the supporting interface includes one or more operations selected from the group consisting of:

an Enqueue operation that adds the request for processing graphics to a queue awaiting processing;

a Cancel operation that cancels the request for processing graphics; and a Terminate operation that cancels all requests in the queue.

* * * * *